United States Patent
Hviid et al.

(10) Patent No.: US 10,439,679 B2
(45) Date of Patent: Oct. 8, 2019

(54) MULTIMODAL COMMUNICATION SYSTEM USING INDUCTION AND RADIO AND METHOD

(71) Applicant: BRAGI GmbH, München (DE)

(72) Inventors: Nikolaj Hviid, München (DE); Eric Christian Hirsch, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 16/169,827

(22) Filed: Oct. 24, 2018

(65) Prior Publication Data
US 2019/0068249 A1   Feb. 28, 2019

Related U.S. Application Data

(63) Continuation of application No. 15/674,737, filed on Aug. 11, 2017, now Pat. No. 10,122,421, which is a (Continued)

(51) Int. Cl.
H04B 5/00 (2006.01)
H04B 5/02 (2006.01)
(Continued)

(52) U.S. Cl.
CPC ............ *H04B 5/02* (2013.01); *H04B 5/0075* (2013.01); *H04R 1/1016* (2013.01);
(Continued)

(58) Field of Classification Search
CPC ...... H04B 5/02; H04B 5/0075; H04B 5/0081; H04W 4/80
(Continued)

(56) References Cited

U.S. PATENT DOCUMENTS 2,325,590 A   8/1943  Carlisle et al.
2,430,229 A   11/1947 Kelsey
(Continued)

FOREIGN PATENT DOCUMENTS

CN   204244472 U   4/2015
CN   104683519 A   6/2015
(Continued)

OTHER PUBLICATIONS

Akkermans, "Acoustic Ear Recognition for Person Identification", Automatic Identification Advanced Technologies, 2005 pp. 219-223.
(Continued)

*Primary Examiner* — April G Gonzales
(74) *Attorney, Agent, or Firm* — Goodhue, Coleman & Owen, P.C.

(57) ABSTRACT

A system of wearable or personal area devices includes a first earpiece and a second ear piece each of the first ear piece and the second ear piece comprising an ear piece housing, an induction circuit disposed within the ear piece housing for short range communications, and a radio transceiver disposed within the ear piece housing for radio communications. The induction circuit of the first ear piece and the induction circuit of the second ear piece are adapted for communication there between using high bandwidth audio.

16 Claims, 3 Drawing Sheets

Related U.S. Application Data continuation of application No. 15/244,782, filed on Aug. 23, 2016, now Pat. No. 9,755,704.

(60) Provisional application No. 62/211,716, filed on Aug. 29, 2015.

(51) Int. Cl.
  *H04R 1/10* (2006.01)
  *H04W 4/80* (2018.01)
  *H04R 5/033* (2006.01)

(52) U.S. Cl.
  CPC ............ *H04R 1/1041* (2013.01); *H04W 4/80* (2018.02); *H04B 5/0081* (2013.01); *H04R 5/033* (2013.01); *H04R 2201/107* (2013.01); *H04R 2420/07* (2013.01)

(58) Field of Classification Search
  USPC ........................................................ 455/41.1
  See application file for complete search history.

(56) References Cited

U.S. PATENT DOCUMENTS

| | | | |
|---|---|---|---|
| 3,047,089 | A | 7/1962 | Zwislocki |
| D208,784 | S | 10/1967 | Sanzone |
| 3,586,794 | A | 6/1971 | Michaelis |
| 3,934,100 | A | 1/1976 | Harada |
| 3,983,336 | A | 9/1976 | Malek et al. |
| 4,069,400 | A | 1/1978 | Johanson et al. |
| 4,150,262 | A | 4/1979 | Ono |
| 4,334,315 | A | 6/1982 | Ono et al. |
| D266,271 | S | 9/1982 | Johanson et al. |
| 4,375,016 | A | 2/1983 | Harada |
| 4,588,867 | A | 5/1986 | Konomi |
| 4,617,429 | A | 10/1986 | Bellafiore |
| 4,654,883 | A | 3/1987 | Iwata |
| 4,682,180 | A | 7/1987 | Gans |
| 4,791,673 | A | 12/1988 | Schreiber |
| 4,852,177 | A | 7/1989 | Ambrose |
| 4,865,044 | A | 9/1989 | Wallace et al. |
| 4,984,277 | A | 1/1991 | Bisgaard et al. |
| 5,008,943 | A | 4/1991 | Arndt et al. |
| 5,185,802 | A | 2/1993 | Stanton |
| 5,191,602 | A | 3/1993 | Regen et al. |
| 5,201,007 | A | 4/1993 | Ward et al. |
| 5,201,008 | A | 4/1993 | Arndt et al. |
| D340,286 | S | 10/1993 | Seo |
| 5,280,524 | A | 1/1994 | Norris |
| 5,295,193 | A | 3/1994 | Ono |
| 5,298,692 | A | 3/1994 | Ikeda et al. |
| 5,343,532 | A | 8/1994 | Shugart |
| 5,347,584 | A | 9/1994 | Narisawa |
| 5,363,444 | A | 11/1994 | Norris |
| D367,113 | S | 2/1996 | Weeks |
| 5,497,339 | A | 3/1996 | Bernard |
| 5,606,621 | A | 2/1997 | Reiter et al. |
| 5,613,222 | A | 3/1997 | Guenther |
| 5,654,530 | A | 8/1997 | Sauer et al. |
| 5,692,059 | A | 11/1997 | Kruger |
| 5,721,783 | A * | 2/1998 | Anderson ............... H04B 1/385 381/328 |
| 5,748,743 | A | 5/1998 | Weeks |
| 5,749,072 | A | 5/1998 | Mazurkiewicz et al. |
| 5,771,438 | A | 6/1998 | Palermo et al. |
| D397,796 | S | 9/1998 | Yabe et al. |
| 5,802,167 | A | 9/1998 | Hong |
| D410,008 | S | 5/1999 | Almqvist |
| 5,929,774 | A | 7/1999 | Charlton |
| 5,933,506 | A | 8/1999 | Aoki et al. |
| 5,949,896 | A | 9/1999 | Nageno et al. |
| 5,987,146 | A | 11/1999 | Pluvinage et al. |
| 6,021,207 | A | 2/2000 | Puthuff et al. |
| 6,054,989 | A | 4/2000 | Robertson et al. |
| 6,081,724 | A | 6/2000 | Wilson |
| 6,084,526 | A | 7/2000 | Blotky et al. |
| 6,094,492 | A | 7/2000 | Boesen |
| 6,111,569 | A | 8/2000 | Brusky et al. |
| 6,112,103 | A | 8/2000 | Puthuff |
| 6,157,727 | A | 12/2000 | Rueda |
| 6,167,039 | A | 12/2000 | Karlsson et al. |
| 6,181,801 | B1 | 1/2001 | Puthuff et al. |
| 6,208,372 | B1 | 3/2001 | Barraclough |
| 6,230,029 | B1 | 5/2001 | Yegiazaryan et al. |
| 6,275,789 | B1 | 8/2001 | Moser et al. |
| 6,339,754 | B1 | 1/2002 | Flanagan et al. |
| D455,835 | S | 4/2002 | Anderson et al. |
| 6,408,081 | B1 | 6/2002 | Boesen |
| 6,424,820 | B1 | 7/2002 | Burdick et al. |
| D464,039 | S | 10/2002 | Boesen |
| 6,470,893 | B1 | 10/2002 | Boesen |
| D468,299 | S | 1/2003 | Boesen |
| D468,300 | S | 1/2003 | Boesen |
| 6,542,721 | B2 | 4/2003 | Boesen |
| 6,560,468 | B1 | 5/2003 | Boesen |
| 6,654,721 | B2 | 11/2003 | Handelman |
| 6,664,713 | B2 | 12/2003 | Boesen |
| 6,690,807 | B1 | 2/2004 | Meyer |
| 6,694,180 | B1 | 2/2004 | Boesen |
| 6,718,043 | B1 | 4/2004 | Boesen |
| 6,738,485 | B1 | 5/2004 | Boesen |
| 6,748,095 | B1 | 6/2004 | Goss |
| 6,754,358 | B1 | 6/2004 | Boesen et al. |
| 6,784,873 | B1 | 8/2004 | Boesen et al. |
| 6,823,195 | B1 | 11/2004 | Boesen |
| 6,852,084 | B1 | 2/2005 | Boesen |
| 6,879,698 | B2 | 4/2005 | Boesen |
| 6,892,082 | B2 | 5/2005 | Boesen |
| 6,920,229 | B2 | 7/2005 | Boesen |
| 6,952,483 | B2 | 10/2005 | Boesen et al. |
| 6,987,986 | B2 | 1/2006 | Boesen |
| 7,010,137 | B1 | 3/2006 | Leedom et al. |
| 7,113,611 | B2 | 9/2006 | Leedom et al. |
| D532,520 | S | 11/2006 | Kampmeier et al. |
| 7,136,282 | B1 | 11/2006 | Rebeske |
| 7,203,331 | B2 | 4/2007 | Boesen |
| 7,209,569 | B2 | 4/2007 | Boesen |
| 7,215,790 | B2 | 5/2007 | Boesen et al. |
| D549,222 | S | 8/2007 | Huang |
| D554,756 | S | 11/2007 | Sjursen et al. |
| 7,403,629 | B1 | 7/2008 | Aceti et al. |
| D579,006 | S | 10/2008 | Kim et al. |
| 7,463,902 | B2 | 12/2008 | Boesen |
| 7,508,411 | B2 | 3/2009 | Boesen |
| D601,134 | S | 9/2009 | Elabidi et al. |
| 7,825,626 | B2 | 11/2010 | Kozisek |
| 7,965,855 | B1 | 6/2011 | Ham |
| 7,979,035 | B2 | 7/2011 | Griffin et al. |
| 7,983,628 | B2 | 7/2011 | Boesen |
| D647,491 | S | 10/2011 | Chen et al. |
| 8,041,066 | B2 | 10/2011 | Solum |
| 8,095,188 | B2 | 1/2012 | Shi |
| 8,108,143 | B1 | 1/2012 | Tester |
| 8,112,066 | B2 | 2/2012 | Ayed |
| 8,140,357 | B1 | 3/2012 | Boesen |
| D666,581 | S | 9/2012 | Perez |
| 8,300,864 | B2 | 10/2012 | Müllenborn et al. |
| 8,406,448 | B2 | 3/2013 | Lin et al. |
| 8,436,780 | B2 | 5/2013 | Schantz et al. |
| 8,467,770 | B1 * | 6/2013 | Ben Ayed ............ H04L 63/107 455/411 |
| D687,021 | S | 7/2013 | Yuen |
| 8,548,532 | B1 | 10/2013 | Ng |
| 8,682,244 | B2 * | 3/2014 | Rhodes ................. H04B 13/02 455/40 |
| 8,719,877 | B2 | 5/2014 | VonDoenhoff et al. |
| 8,774,434 | B2 | 7/2014 | Zhao et al. |
| 8,831,266 | B1 | 9/2014 | Huang |
| 8,891,800 | B1 | 11/2014 | Shaffer |
| 8,994,498 | B2 | 3/2015 | Agrafioti et al. |
| D728,107 | S | 4/2015 | Martin et al. |
| 9,013,145 | B2 | 4/2015 | Castillo et al. |
| 9,037,125 | B1 | 5/2015 | Kadous |
| D733,103 | S | 6/2015 | Jeong et al. |

(56) References Cited

U.S. PATENT DOCUMENTS

| | | | |
|---|---|---|---|
| 9,081,944 B2 | 7/2015 | Camacho et al. | |
| 9,510,159 B1 | 11/2016 | Cuddihy et al. | |
| D773,439 S | 12/2016 | Walker | |
| D775,158 S | 12/2016 | Dong et al. | |
| D777,710 S | 1/2017 | Palmborg et al. | |
| D788,079 S | 5/2017 | Son et al. | |
| 2001/0005197 A1 | 6/2001 | Mishra et al. | |
| 2001/0027121 A1 | 10/2001 | Boesen | |
| 2001/0043707 A1 | 11/2001 | Leedom | |
| 2001/0056350 A1 | 12/2001 | Calderone et al. | |
| 2002/0002413 A1 | 1/2002 | Tokue | |
| 2002/0007510 A1 | 1/2002 | Mann | |
| 2002/0010590 A1 | 1/2002 | Lee | |
| 2002/0030637 A1 | 3/2002 | Mann | |
| 2002/0046035 A1 | 4/2002 | Kitahara et al. | |
| 2002/0057810 A1 | 5/2002 | Boesen | |
| 2002/0076073 A1 | 6/2002 | Taenzer et al. | |
| 2002/0118852 A1 | 8/2002 | Boesen | |
| 2003/0002705 A1 | 1/2003 | Boesen | |
| 2003/0065504 A1 | 4/2003 | Kraemer et al. | |
| 2003/0100331 A1 | 5/2003 | Dress et al. | |
| 2003/0104806 A1 | 6/2003 | Ruef et al. | |
| 2003/0115068 A1 | 6/2003 | Boesen | |
| 2003/0125096 A1 | 7/2003 | Boesen | |
| 2003/0218064 A1 | 11/2003 | Conner et al. | |
| 2004/0070564 A1 | 4/2004 | Dawson et al. | |
| 2004/0160511 A1 | 8/2004 | Boesen | |
| 2005/0017842 A1 | 1/2005 | Dematteo | |
| 2005/0043056 A1 | 2/2005 | Boesen | |
| 2005/0094839 A1 | 5/2005 | Gwee | |
| 2005/0125320 A1 | 6/2005 | Boesen | |
| 2005/0148883 A1 | 7/2005 | Boesen | |
| 2005/0165663 A1 | 7/2005 | Razumov | |
| 2005/0196009 A1 | 9/2005 | Boesen | |
| 2005/0251455 A1 | 11/2005 | Boesen | |
| 2005/0266876 A1 | 12/2005 | Boesen | |
| 2006/0029246 A1 | 2/2006 | Boesen | |
| 2006/0073787 A1* | 4/2006 | Lair | H04M 1/6066 455/41.1 |
| 2006/0074671 A1 | 4/2006 | Farmaner et al. | |
| 2006/0074808 A1 | 4/2006 | Boesen | |
| 2006/0166715 A1 | 7/2006 | Engelen et al. | |
| 2006/0166716 A1 | 7/2006 | Seshadri et al. | |
| 2006/0220915 A1 | 10/2006 | Bauer | |
| 2006/0258412 A1 | 11/2006 | Liu | |
| 2008/0076972 A1 | 3/2008 | Dorogusker et al. | |
| 2008/0090622 A1 | 4/2008 | Kim et al. | |
| 2008/0146890 A1 | 6/2008 | LeBoeuf et al. | |
| 2008/0201138 A1* | 8/2008 | Visser | G10L 21/0208 704/227 |
| 2008/0254780 A1 | 10/2008 | Kuhl et al. | |
| 2008/0255430 A1 | 10/2008 | Alexandersson et al. | |
| 2009/0003620 A1 | 1/2009 | McKillop et al. | |
| 2009/0008275 A1 | 1/2009 | Ferrari et al. | |
| 2009/0017881 A1 | 1/2009 | Madrigal | |
| 2009/0073070 A1 | 3/2009 | Rofougaran | |
| 2009/0097689 A1 | 4/2009 | Prest et al. | |
| 2009/0105548 A1 | 4/2009 | Bart | |
| 2009/0191920 A1 | 7/2009 | Regen et al. | |
| 2009/0245559 A1 | 10/2009 | Boltyenkov et al. | |
| 2009/0261114 A1 | 10/2009 | McGuire et al. | |
| 2009/0296968 A1 | 12/2009 | Wu et al. | |
| 2010/0033313 A1 | 2/2010 | Keady et al. | |
| 2010/0203831 A1 | 8/2010 | Muth | |
| 2010/0210212 A1 | 8/2010 | Sato | |
| 2010/0320961 A1 | 12/2010 | Castillo et al. | |
| 2011/0140844 A1 | 6/2011 | McGuire et al. | |
| 2011/0215921 A1* | 9/2011 | Ben Ayed | H04B 7/00 340/539.11 |
| 2011/0239497 A1 | 10/2011 | McGuire et al. | |
| 2011/0286615 A1 | 11/2011 | Olodort et al. | |
| 2012/0057740 A1 | 3/2012 | Rosal | |
| 2012/0231732 A1* | 9/2012 | Kerselaers | H04B 5/0006 455/41.1 |
| 2013/0065617 A1 | 3/2013 | Peled | |
| 2013/0137491 A1 | 5/2013 | Tanaka et al. | |
| 2013/0295845 A1* | 11/2013 | Maenpaa | H04B 5/0006 455/41.1 |
| 2013/0316642 A1 | 11/2013 | Newham | |
| 2013/0316679 A1* | 11/2013 | Miller | H04M 1/6041 455/412.1 |
| 2013/0324047 A1* | 12/2013 | Wells | H04R 5/033 455/41.3 |
| 2013/0346168 A1 | 12/2013 | Zhou et al. | |
| 2014/0011446 A1* | 1/2014 | Kangas | H04B 5/0031 455/41.1 |
| 2014/0079257 A1 | 3/2014 | Ruwe et al. | |
| 2014/0106677 A1 | 4/2014 | Altman | |
| 2014/0113615 A1* | 4/2014 | Yao | H04M 1/6066 455/418 |
| 2014/0122116 A1 | 5/2014 | Smythe | |
| 2014/0153768 A1* | 6/2014 | Hagen | H04R 1/1008 381/380 |
| 2014/0163771 A1 | 6/2014 | Demeniuk | |
| 2014/0185828 A1 | 7/2014 | Helbling | |
| 2014/0200883 A1* | 7/2014 | Usher | G10L 21/0388 704/205 |
| 2014/0219467 A1* | 8/2014 | Kurtz | H04R 3/12 381/74 |
| 2014/0222462 A1 | 8/2014 | Shakil et al. | |
| 2014/0235169 A1 | 8/2014 | Parkinson et al. | |
| 2014/0270191 A1 | 9/2014 | Nikles | |
| 2014/0270227 A1 | 9/2014 | Swanson | |
| 2014/0270271 A1 | 9/2014 | Dehe et al. | |
| 2014/0323183 A1* | 10/2014 | Klein | H04B 1/385 455/569.1 |
| 2014/0335908 A1* | 11/2014 | Krisch | H04W 4/21 455/518 |
| 2014/0348367 A1 | 11/2014 | Vavrus et al. | |
| 2015/0028996 A1 | 1/2015 | Agrafioti et al. | |
| 2015/0110587 A1 | 4/2015 | Hori | |
| 2015/0148989 A1 | 5/2015 | Cooper et al. | |
| 2015/0226621 A1* | 8/2015 | Zhu | G01L 5/0052 702/41 |
| 2015/0245127 A1 | 8/2015 | Shaffer | |
| 2015/0373172 A1* | 12/2015 | Boesen | H04M 1/05 455/41.3 |
| 2016/0021229 A1* | 1/2016 | Lewis | H04M 1/6033 455/420 |
| 2016/0033280 A1 | 2/2016 | Moore et al. | |
| 2016/0072558 A1 | 3/2016 | Hirsch et al. | |
| 2016/0073189 A1 | 3/2016 | Lindén et al. | |
| 2016/0125892 A1 | 5/2016 | Bowen et al. | |
| 2016/0360350 A1 | 12/2016 | Watson et al. | |
| 2017/0059152 A1 | 3/2017 | Hirsch et al. | |
| 2017/0060262 A1 | 3/2017 | Hviid et al. | |
| 2017/0060269 A1 | 3/2017 | Förstner et al. | |
| 2017/0061751 A1 | 3/2017 | Loermann et al. | |
| 2017/0062913 A1 | 3/2017 | Hirsch et al. | |
| 2017/0064426 A1 | 3/2017 | Hviid | |
| 2017/0064428 A1 | 3/2017 | Hirsch | |
| 2017/0064432 A1 | 3/2017 | Hviid et al. | |
| 2017/0064437 A1 | 3/2017 | Hviid et al. | |
| 2017/0078780 A1 | 3/2017 | Qian et al. | |
| 2017/0108918 A1 | 4/2017 | Boesen | |
| 2017/0109131 A1 | 4/2017 | Boesen | |
| 2017/0110124 A1 | 4/2017 | Boesen et al. | |
| 2017/0110899 A1 | 4/2017 | Boesen | |
| 2017/0111723 A1 | 4/2017 | Boesen | |
| 2017/0111725 A1 | 4/2017 | Boesen et al. | |
| 2017/0111726 A1 | 4/2017 | Martin et al. | |
| 2017/0111740 A1 | 4/2017 | Hviid et al. | |
| 2017/0151447 A1 | 6/2017 | Boesen | |
| 2017/0151668 A1 | 6/2017 | Boesen | |
| 2017/0151918 A1 | 6/2017 | Boesen | |
| 2017/0151930 A1 | 6/2017 | Boesen | |
| 2017/0151957 A1 | 6/2017 | Boesen | |
| 2017/0151959 A1 | 6/2017 | Boesen | |
| 2017/0153114 A1 | 6/2017 | Boesen | |
| 2017/0153636 A1 | 6/2017 | Boesen | |
| 2017/0154532 A1 | 6/2017 | Boesen | |
| 2017/0155985 A1 | 6/2017 | Boesen | |
| 2017/0155992 A1 | 6/2017 | Perianu et al. | |

(56) References Cited

U.S. PATENT DOCUMENTS

| | | |
|---|---|---|
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0257698 A1 | 9/2017 | Boesen et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Announcing the $3,333,333 Stretch Goal (Feb. 24, 2014) pp. 1-14.
Ben Coxworth: "Graphene-based ink could enable low-cost, foldable electronics", "Journal of Physical Chemistry Letters", Northwestern University, (May 22, 2013), pp. 1-7.
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI is on Facebook (2014), pp. 1-51.
BRAGI Update—Arrival of Prototype Chassis Parts—More People—Awesomeness (May 13, 2014), pp. 1-8.
BRAGI Update—Chinese New Year, Design Verification, Charging Case, More People, Timeline(Mar. 6, 2015), pp. 1-18.
BRAGI Update—First Sleeves From Prototype Tool—Software Development Kit (Jun. 5, 2014), pp. 1-8.
BRAGI Update—Let's Get Ready to Rumble, A Lot to Be Done Over Christmas (Dec. 22, 2014), pp. 1-18.
BRAGI Update—Memories From April—Update on Progress (Sep. 16, 2014), pp. 1-15.
BRAGI Update—Memories from May—Update on Progress—Sweet (Oct. 13, 2014), pp. 1-16.
BRAGI Update—Memories From One Month Before Kickstarter—Update on Progress (Jul. 10, 2014), pp. 1-17.
BRAGI Update—Memories From the First Month of Kickstarter—Update on Progress (Aug. 1, 2014), pp. 1-16.
BRAGI Update—Memories From the Second Month of Kickstarter—Update on Progress (Aug. 22, 2014), pp. 1-15.
BRAGI Update—New People @BRAGI—Prototypes (Jun. 26, 2014), pp. 1-9.
BRAGI Update—Office Tour, Tour to China, Tour to CES (Dec. 11, 2014), pp. 1-14.
BRAGI Update—Status on Wireless, Bits and Pieces, Testing-Oh Yeah, Timeline(Apr. 24, 2015), pp. 1-18.
BRAGI Update—The App Preview, the Charger, the SDK, BRAGI Funding and Chinese New Year (Feb. 11, 2015), pp. 1-19.
BRAGI Update—What We Did Over Christmas, Las Vegas & CES (Jan. 19, 2014), pp. 1-21.
BRAGI Update—Years of Development, Moments of Utter Joy and Finishing What We Started(Jun. 5, 2015), pp. 1-21.
BRAGI Update—Alpha 5 and Back to China, Backer Day, on Track(May 16, 2015), pp. 1-15.
BRAGI Update—Beta2 Production and Factory Line(Aug. 20, 2015), pp. 1-16.
BRAGI Update—Certifications, Production, Ramping Up (Nov. 13, 2015), pp. 1-15.
BRAGI Update—Developer Units Shipping and Status(Oct. 5, 2015), pp. 1-20.
BRAGI Update—Developer Units Started Shipping and Status (Oct. 19, 2015), pp. 1-20.
BRAGI Update—Developer Units, Investment, Story and Status(Nov. 2, 2015), pp. 1-14.
BRAGI Update—Getting Close(Aug. 6, 2015), pp. 1-20.
BRAGI Update—On Track, Design Verification, How It Works and What's Next(Jul. 15, 2015), pp. 1-17.
BRAGI Update—On Track, on Track and Gems Overview (Jun. 24, 2015), pp. 1-19.
BRAGI Update—Status on Wireless, Supply, Timeline and Open House@BRAGI(Apr. 1, 2015), pp. 1-17.
BRAGI Update—Unpacking Video, Reviews on Audio Perform and Boy Are We Getting Close(Sep. 10, 2015), pp. 1-15.
Healthcare Risk Management Review, "Nuance updates computer-assisted physician documentation solution" (Oct. 20, 2016), pp. 1-2.
Hoyt et. al., "Lessons Learned from Implementation of Voice Recognition for Documentation in the Military Electronic Health Record System", The American Health Information Management Association (2017), pp. 1-8.
Hyundai Motor America, "Hyundai Motor Company Introduces a Health + Mobility Concept for Wellness in Mobility", Fountain Valley, Californa (2017), pp. 1-3.
International Search Report & Written Opinion, PCT/EP2016/070231 (Nov. 18, 2016).
Last Push Before the Kickstarter Campaign Ends on Monday 4pm CET (Mar. 28, 2014), pp. 1-7.
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—Its Your Dash (Feb. 14, 2014), pp. 1-14.
Stretchgoal—The Carrying Case for the Dash (Feb. 12, 2014), pp. 1-9.
Stretchgoal—Windows Phone Support (Feb. 17, 2014), pp. 1-17.
The Dash + The Charging Case & the BRAGI News (Feb. 21, 2014), pp. 1-12.
The Dash—A Word From Our Software, Mechanical and Acoustics Team + An Update (Mar. 11, 2014), pp. 1-7.
Update From BRAGI—$3,000,000—Yipee (Mar. 22, 2014), pp. 1-11.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

\* cited by examiner

MULTIMODAL COMMUNICATION SYSTEM USING INDUCTION AND RADIO AND METHOD

PRIORITY STATEMENT

This application is a continuation of U.S. patent application Ser. No. 15/674,737 filed on Aug. 11, 2017 and claims priority to U.S. Pat. No. 9,755,704 filed on Aug. 23, 2016 and U.S. Provisional Patent Application No. 62/211,716 filed on Aug. 29, 2015 all of which are titled Multimodal Communication System Using Induction and Radio and Method all of which are hereby incorporated by reference in their entireties.

FIELD OF THE INVENTION

The present invention relates to wearable devices. More particularly, but not exclusively, the present invention relates to a multimodal communication system using induction and radio communications.

BACKGROUND

One of the problems with wearable devices relates to communications. For purposes here, examples of problems with ear piece systems are described although the present invention is not necessarily limited to this particular context. For example, where there are two earpieces a Bluetooth transmission failure may be detected between the two earpieces precluding an inter-ear system from working. Even with recalibration and RF tuning, a persistent and unacceptable drop in output from the paired earpiece may occur. Such performance is untenable, as devices should work in a number of different use environments and user situations. Using the 2.4 GHz band, this wavelength may be absorbed to a great degree by the surrounding soft tissues of the head, brain and neck. Further, transmission power may be limited by space as well as the requirement of device placement at the external auditory canal. Power requirements using high frequency communications such as those found in the ISM band or Bluetooth standard to adequately transmit to a counterpart wireless earpiece may be physiologically unacceptable. FM transmissions may also have issues with interference, privacy concerns and geographical variances. Additionally, Bluetooth standard transmissions may not be able to accommodate to the anatomic demands of transmission through or around the soft tissues of the cranium. Still further, such a system may be unstable in high humidity environments such as on a beach, walking through snow, on a forest floor or while submerged in water. What is needed is an improved wearable device which may communicate with other wearable devices.

SUMMARY

Therefore, it is a primary object, feature, or advantage to improve over the state of the art.

It is a further object, feature, or advantage to provide an improved earpiece and/or set of ear pieces.

It is a still further object, feature, or advantage to provide the ability to transfer high quality audio and data streams between the two earpieces.

Another object, feature, or advantage is to minimize deterioration of signal between two earpieces.

Yet another object, feature, or advantage is to provide high quality transmission of inter device signals such as inter ear signals.

A further object, feature, or advantage is providing devices such as earpieces which are stable when in proximity to water and high humidity states, forest floors, beaches, skiing, running or walking through the snow, to name but a few examples of environmental conditions.

One or more of these and/or other objects, features, or advantages will become apparent from the specification and claims that follow. No single embodiment need exhibit each and every object, feature, or advantage. It is contemplated that different embodiments will have different objects, features, or advantages.

According to one aspect a system of wearable devices is provided. The system includes a first earpiece and a second ear piece. Each of the earpieces includes an ear piece housing, an induction circuit disposed within the ear piece housing for short range communications, and a radio transceiver disposed within the ear piece housing for radio communications. The induction circuit of the first ear piece and the induction circuit of the second ear piece are adapted for communication there between. The induction circuit may be a near field magnetic induction circuit or other type of induction circuit. The radio transceiver may be a Bluetooth radio transceiver, a frequency modulation (FM) radio transceiver or other type of radio transceiver. The system may further include a mobile device in operative communication with the first earpiece via the radio transceiver disposed within the ear piece housing of the first earpiece. The mobile device may also be in operative communication with the second earpiece via the radio transceiver disposed within the ear piece housing of the second earpiece. The system also may further encompass other devices constituting a personal area network. Such devices are not limited to wearable, ingestible and implantable devices.

According to another aspect, an earpiece includes an earpiece housing, an induction circuit disposed within the ear piece housing for short range communication, and a radio transceiver disposed within the ear piece housing for radio communications. The earpiece may be a left earpiece or a right earpiece. The induction circuit may be a near field induction circuit, a magnetic induction circuit, or other type of induction circuit. The earpiece may further include a battery disposed within the earpiece, the battery operatively connected to the induction circuit and the radio transceiver. There may be an intelligent control disposed within the earpiece housing, the intelligent control operatively connected to the induction circuit and the radio transceiver. There may be at least one microphone associated with the earpiece housing. There may be at least one speaker associated with the earpiece housing.

According to another aspect, an earpiece includes an earpiece housing, an induction circuit disposed within the ear piece housing for short range communication, a radio transceiver disposed within the ear piece housing for radio communications, an intelligent control disposed within the earpiece housing, a microphone associated with the earpiece housing, a speaker associated with the earpiece housing, and a battery disposed within the earpiece housing and operatively connected to the induction circuit, the radio transceiver and the intelligent control. The induction circuit may be a near field magnetic induction circuit or other type of induction circuit. The radio transceiver may be a Bluetooth transceiver or other type of radio transceiver.

According to another aspect, a method for communication between wearable and personal area devices is provided.

The method includes providing a first wearable device comprising a wearable device housing, an induction circuit disposed within the wearable device housing for short range communication, and a radio transceiver disposed within the wearable device housing for radio communications. The method further includes providing a second wearable device comprising a wearable or personal area device housing, an induction circuit disposed within the wearable device housing for short range communication, and a radio transceiver disposed within the wearable device housing for radio communications. The method further includes communicating information between the first wearable device and the second wearable device using the induction circuit of the first wearable device and the induction circuit of the second wearable device. The communicating information may include communicating the information through a human body. The first wearable device may be a first earpiece and the second wearable device may be a second earpiece. The step of communicating the information through the human body may include communicating the information through a head. The information may include an audio stream or other data. The method may further include communicating data between the first wearable device and a computing device or mobile device using the radio transceiver of the first wearable or personal area device. Similarly, the method may further include communicating data between the second wearable or personal area device and a computing device or mobile device using the radio transceiver of the second wearable or personal area device. Information communicated with the induction circuitry may include high bandwidth audio including audio greater than that associated with the vocal range, audio more than 7 kHz, 8 kHz, 9 kHz, 10 kHz, 11 kHz, 12 kHz, 13 kHz, 14 kHz, 15 kHz, 16 kHz, 17 kHz, 18 kHz, with less than 3 dB loss.

DETAILED DESCRIPTION

Figure 1:
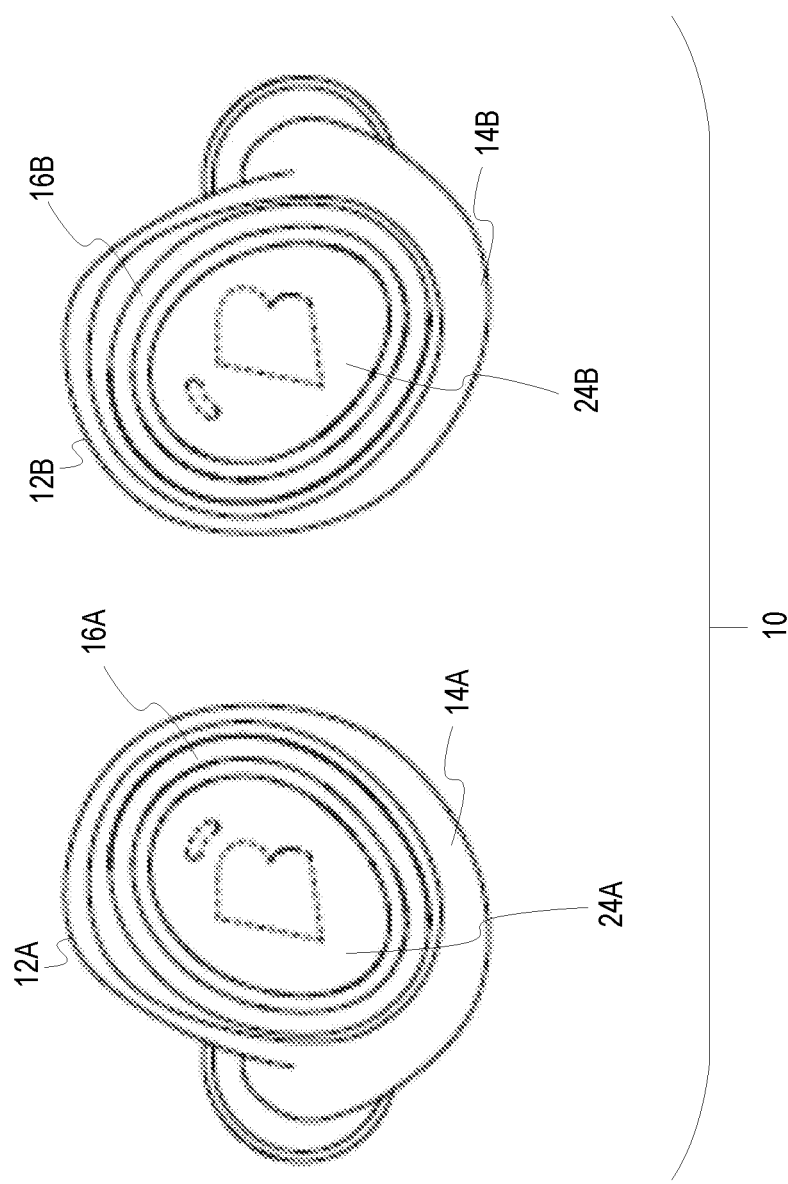
FIG. 1 illustrates one example of a system of wearable devices in the form of a set of ear pieces.

FIG. 1 illustrates one example of a wearable device in the form of a set of earpieces 10 including a left ear piece 12A and a right earpiece 12B. Each of the ear pieces 12A, 12B has an ear piece housing 14A, 14B which may be in the form of a protective shell or casing which is preferably water resistant or water tight to allow the ear pieces to function across a number of different environmental conditions including when submerged in water or in high humidity. A light display area 16A, 16B is present on each of the ear pieces 12A, 12B. The light generation areas 16A, 16B each provide for producing light of one or more colors.

The wearable device may provide for a plurality of different modes of operation. One mode of operation of the device relates to gestural movements. For example, where a user performs a gestural movement which is interpreted by the device the device may light or activate one or more lighting elements to confirm the gestural movement or to indicate that the gestural movement could not be interpreted. In addition, audio feedback may be used to confirm a gestural movement or to indicate that the gestural movement could not be interpreted. As shown, one or more detectors or receivers 24A, 24B may also be present to detect changes in energy fields associated with gestures performed by a user. The receivers 24A, 24B in combination with one or more emitters provide a gesture-based user interface.

Figure 2:
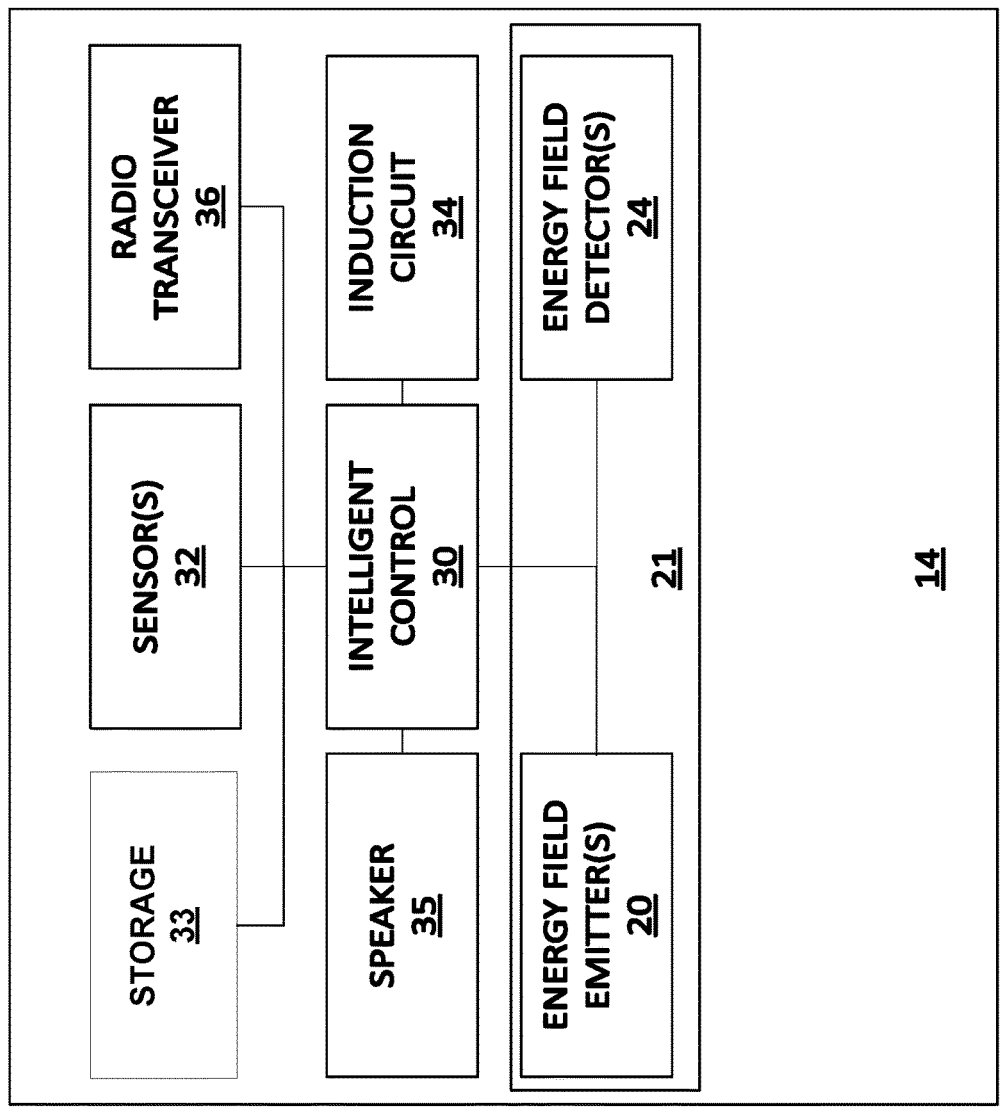
FIG. 2 is a block diagram illustrating one example of a wearable device.

Also, as shown in FIG. 2, an intelligent control 30 which may include one or more processors or other circuits is shown. The intelligent control 30 is operatively connected to one or more sensor(s) 32 which may include one or more microphones, one or more inertial sensors (such as accelerometers, gyro sensors, compass, or magnetometers), one or more physiological parameter sensors (such as a pulse oximeter or temperature sensor), a temperature sensor, or combinations thereof. Preferably at least one of the microphones has a frequency response suitable for ambient or environment sounds including the ability to pick up sounds well above the 7 kHz or so associated with the vocal range. Thus, the device may be configured to allow unimpeded or unmodified environmental sounds to be captured and reproduced for the user by capturing the sounds at one side of a barrier formed by the ear piece housing and reproducing the sounds at a speaker 35 at the other side of the barrier. The intelligent control 30 is also operatively connected to the speaker 35. The intelligent control may include a data processor and a signal processor. The intelligent control 30 is also operatively connected to both an induction circuit 34 and a radio transceiver 36 and storage 33. The storage may be used to store one or more audio files and may be a solid-state memory or other memory. Thus, an audio stream associated with an audio file may be communicated through the induction circuit 34 to another device. A battery (not shown) which is also housed within the wearable device housing may be used in a conventional manner to power the various components of the wearable device.

The wearable devices may communicate with each other to share information. This information may include information related to user input such as gestures performed at one of the devices. This information may also include other information such as audio streams received at one of the devices. Of course, other information may also be communicated between the wearable devices. Each of the wearable devices includes the induction circuit 34 which may be a magnetic induction circuit, a near field induction circuit, or a near field magnetic induction circuit. Use of the induction circuit 34 allows the wearable devices to communicate with one another even through the human body. Where the wearable devices are both earpieces, the induction circuit 34 allows the earpieces to communicate through the human head. A near field magnetic induction (NFMI) circuit may include a core and a plurality of coil turns wrapped around the core. The core may include ferrite or may be an open-air core or other type of core.

Figure 3:
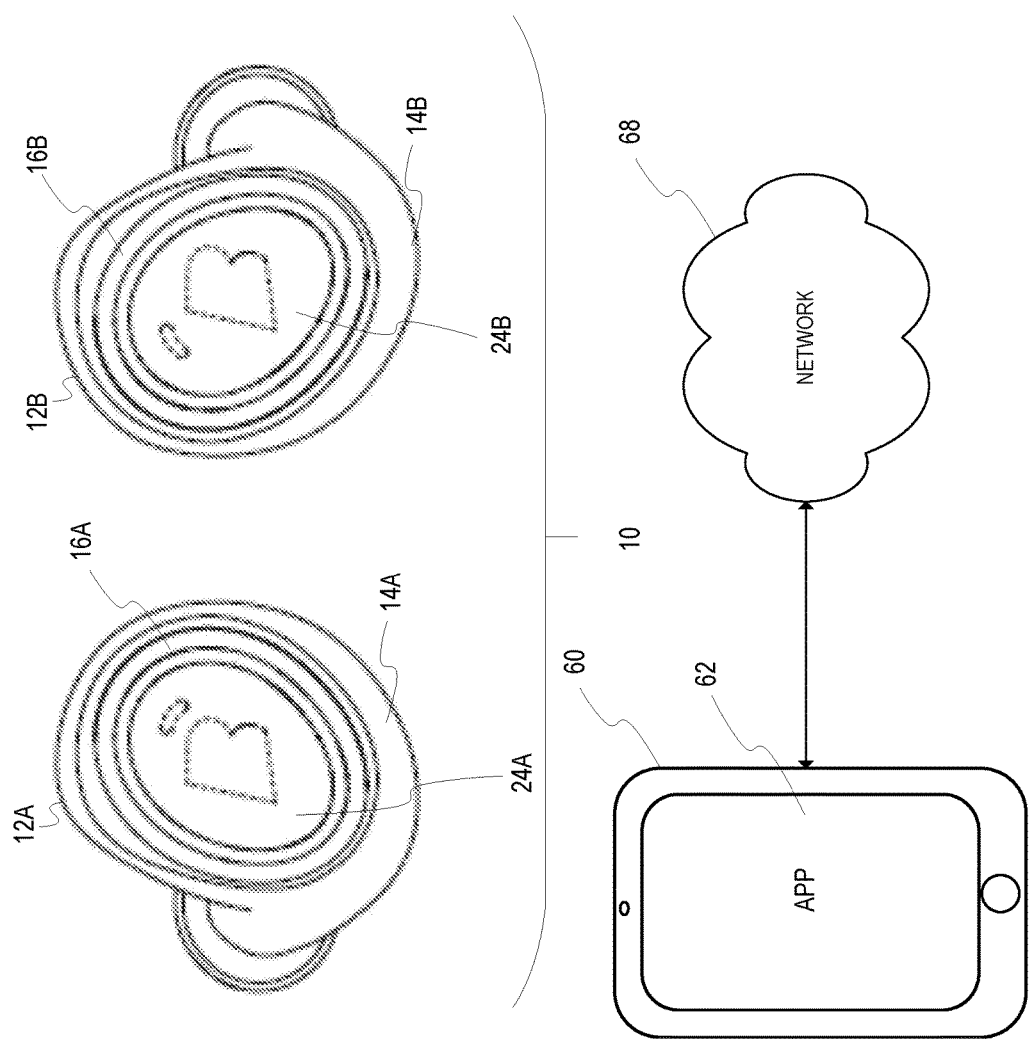
FIG. 3 illustrates an example of a system of wearable devices in operative communication with a computing device in the form of a mobile device.

The wearable devices 14 also include a radio transceiver 36 for wireless communications. Although it is contemplated that the radio transceiver 36 may be of any number of types and use any number of different communication protocols, one example of a radio transceiver that may be used is a Bluetooth radio transceiver. Other examples include ultra-wideband (UWB) transceivers, frequency modulation (FM) radio transceivers, or any number of other types of radio transceivers. One of the purposes of the radio transceiver 36 is for communication with other computing devices including mobile devices. FIG. 3 illustrates one example of a mobile device 60 with a machine-readable storage medium upon which a software application or "app" 62 may be stored. The radio transceiver may be used to communicate information between the wearable device and the mobile device 60. The information may include one or more audio streams. For example, the mobile device 60 may communicate an incoming audio stream including a voice signal associated with a phone call or chat session or audio or video conference to the radio transceiver of the wearable device. Similarly, the radio transceiver of the wearable device may communicate an outgoing audio stream including a voice signal associated with the user of the wearable device to the mobile device. Alternatively, music may be streamed to or from the wearable device. Of course, there are many other examples of information which may be communicated between the wearable device and mobile devices or computing devices. This may include user input, sensor readings, audio information, diagnostic information, and other types of information or data. In addition, the mobile device 60 and app 62 may be operatively connected to a network 68 and may communicate user input, sensor readings, audio information, diagnostic information, and other types of information or data across the network 68.

Thus, in operation a method is provided for communication between wearable devices. The method may include communicating information between the first wearable or personal area device and the second wearable or personal area device using the induction circuit of the first wearable device and the induction circuit of the second wearable device. The information may be of any number of types including an audio stream or a stream from an input sensor signal or other type of data. Note that using an induction circuit avoids numerous issues associated with radio communications including the need for frequent recalibration, RF tuning, persistent and unacceptable drops in outputs, and other issues. Moreover, using an induction circuit avoids issues with the body absorbing the RF especially the soft tissues of the head, brain and neck. In addition, use of the induction circuit is appropriate for communications in any number of different environments including high humidity environments such as on a beach, walking through snow, on a forest floor or while submerged in water.

It is to be further understood that where the devices are ear pieces or other wearable or personal area devices, that the induction circuit is configured for high bandwidth audio suitable for music or ambient noise. Note that this is in contrast to devices such as hearing aids which have bandwidths specifically constrained to those associated with the vocal range (e.g. around 7 kHz and under). Thus, preferably the device is configured to provide a bandwidth of more than 7 kHz (with less than 3 dB loss), more than 8 kHz (with less than 3 dB loss), more than 9 kHz (with less than 3 dB loss), more than 10 kHz (with less than 3 dB loss), more than 11 kHz (with less than 3 dB loss), more than 12 kHz (with less than 3 dB loss), more than 13 kHz (with less than 3 dB loss), more than 14 kHz (with less than 3 dB loss), more than 15 kHz (with less than 3 dB loss), more than 16 kHz (with less than 3 dB loss), more than 17 kHz (with less than 3 dB loss), more than 18 kHz (with less than 3 dB loss), more than 19 kHz (with less than 3 dB loss), or more than 20 kHz (with less than 3 dB loss). Therefore, the term "high bandwidth audio" as used herein refers to a bandwidth which is greater than that associated with the vocal range and thus more than 7 kHz with less than 3 dB loss. The induction circuit is configured for high bandwidth audio by selection of the coil parameters and/or other circuitry which achieve the desired bandwidth and loss.

Therefore, various examples of wearable or personal area devices and related methodologies and systems have been shown and described. It is to be understood that the present invention contemplates numerous options, variations, and alternatives. Therefore, the present invention is not to be limited to the specific disclosure set forth herein.

What is claimed is:

1. A set of earpieces, comprising:
   a first earpiece comprising:
   (a) a first earpiece housing, wherein the first earpiece housing is watertight;
   (b) an induction circuit disposed within the first earpiece housing for short range communication of high bandwidth audio, wherein the induction circuit is a near field magnetic induction circuit;
   (c) a radio transceiver disposed within the first earpiece housing for radio communications;
   (d) a speaker disposed within the first earpiece housing;
   (e) an intelligent control disposed within the first earpiece housing, the intelligent control operatively connected to the induction circuit, the radio transceiver and the speaker;
   (f) an emitter and a detector operatively connected to the intelligent control for receiving user input; and
   (g) a solid state memory operatively connected to the intelligent control for storing one or more audio files; and
   a second earpiece comprising:
   (a) a second earpiece housing, wherein the second earpiece housing is watertight,
   (b) a speaker disposed within the second earpiece housing; and
   (c) an induction circuit disposed within the second earpiece housing for short range communication with the first earpiece wherein the induction circuit is a near field magnetic induction circuit, wherein the high bandwidth audio received from the first earpiece induction circuit is greater than 10 kHz with less than 3 dB loss.

2. The system of claim 1, wherein the radio transceiver is a Bluetooth radio transceiver.

3. The system of claim 1, further comprising a mobile device in operative communication with the first earpiece via the radio transceiver disposed within the earpiece housing of the first earpiece.

4. The system of claim 1, further comprising at least one microphone with a frequency response suitable for ambient sounds.

5. The system of claim 4, wherein the at least one microphone can pick up sounds well above the 7 kHz or so associated with the vocal range.

6. The system of claim 5, wherein the first earpiece housing forms a barrier between the at least one microphone and the speaker.

7. The system of claim 6, wherein the at least one microphone captures unmodified environmental sounds on one side of the barrier and the speaker reproduces the environmental sounds for the user at an opposite side of a barrier formed by earpiece housing.

8. An earpiece comprising:
   an earpiece housing, wherein the earpiece housing is watertight;
   a near field magnetic induction circuit disposed within the earpiece housing for short range communication, wherein the near field magnetic induction circuit within the earpiece is adapted for communications using a high bandwidth audio of greater than 10 kHz and less than 20 kHz with less than 3 dB loss;
   a Bluetooth transceiver disposed within the earpiece housing for radio communications;

at least one microphone disposed with the earpiece housing, wherein the at least one microphone is configured to allow environmental sounds to be captured;

a speaker disposed within the earpiece housing, wherein the speaker reproduces the environmental sounds captured by the at least one microphone;

an intelligent control disposed within the earpiece housing, the intelligent control operatively connected to the near field magnetic induction circuit, the radio transceiver, the speaker and the at least one microphone;

an emitter and a detector operatively connected to the intelligent control for receiving user input; and a solid state memory operatively connected to the intelligent control for storing one or more audio files.

9. The earpiece of claim 8, further comprising a battery disposed within the earpiece, the battery operatively connected to the intelligent control and the radio transceiver.

10. A method for communication between a set of earpieces, comprising the steps of:

receiving ambient or environmental sound at at least one microphone operatively coupled to a first or a second earpiece housing;

communicating information between a first earpiece and a second earpiece using an induction circuit of the first earpiece and an induction circuit of the second earpiece; and reproducing the information in an audible form by a speaker operatively coupled to the second or the first earpiece housing;

wherein the induction circuit disposed within the earpiece housing for short range communication uses high bandwidth audio of between 10 kHz and 20 kHz bandwidth with less than a 3 dB loss.

11. The method of claim 10, further comprising the steps of combining the step of combining the ambient or the environmental sound with an audio stream with a processor operatively coupled to the at least one microphone within the first or the second earpiece housing.

12. The method of claim 11, further comprising the step of processing the information to be sent between the first earpiece and the second earpiece.

13. The method of claim 12, further comprising the step of storing the audio stream within a memory operatively coupled to the processor within the first or the second earpiece housing.

14. The method of claim 13, further comprising the step of communicating with a mobile device through a radio transceiver operatively coupled to the processor within the first earpiece housing.

15. The method of claim 14, wherein the induction circuit disposed within the earpiece housing for short range communication uses high bandwidth audio of between 12 kHz and 20 kHz bandwidth with less than a 3 dB loss.

16. The method of claim 15, wherein the first and the second earpiece housing act as a barrier between the at least one microphone and the speaker.

* * * * *